(12) United States Patent
Zhang et al.

(10) Patent No.: US 11,463,564 B2
(45) Date of Patent: Oct. 4, 2022

(54) FOLDING MOBILE TERMINAL

(71) Applicant: VIVO MOBILE COMMUNICATION CO., LTD., Guangdong (CN)

(72) Inventors: Heng Zhang, Dongguan (CN); Zhichu Pan, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/329,612

(22) Filed: May 25, 2021

(65) Prior Publication Data
US 2021/0281668 A1    Sep. 9, 2021

Related U.S. Application Data (63) Continuation of application No. PCT/CN2019/115602, filed on Nov. 5, 2019.

(30) Foreign Application Priority Data

Nov. 28, 2018 (CN) .......................... 201811448862.5

(51) Int. Cl.
*H04B 1/38* (2015.01)
*H04M 1/02* (2006.01)

(52) U.S. Cl.
CPC ....... *H04M 1/0222* (2013.01); *H04M 1/0264* (2013.01); *H04M 1/0266* (2013.01); *H04M 2250/16* (2013.01)

(58) Field of Classification Search
CPC .. H04M 1/021; H04M 1/0212; H04M 1/0214; H04M 1/0222; H04M 1/0233; H04M 1/0268
See application file for complete search history.

(56) References Cited

U.S. PATENT DOCUMENTS 8,042,231 B2    10/2011 Bae et al.
2006/0042044 A1    3/2006 Hwang et al.
(Continued)

FOREIGN PATENT DOCUMENTS

CN    1741723 A    3/2006
CN    1839361 A    9/2006
(Continued)

OTHER PUBLICATIONS

International Search Report and Written Opinion of the International Searching Authority regarding International Patent Application No. PCT/CN2019/115602, dated Feb. 10, 2020. Translation provided by Bohui Intellectual Property.

(Continued)

*Primary Examiner* — Tuan Pham
(74) *Attorney, Agent, or Firm* — Harness, Dickey & Pierce, P.L.C.

(57) ABSTRACT

A folding mobile terminal includes a first housing, a first screen, a second housing, a second screen, and a connecting clamp. The first screen is disposed on the first housing, and the second screen is disposed on the second housing. The first housing is connected to the second housing through the connecting clamp, one end of the connecting clamp is rotatably connected to the first housing and rotates around a first axis. The second housing is rotatably connected to another end of the connecting clamp and rotates around a second axis. The first axis and the second axis intersect or are non-coplanar.

12 Claims, 7 Drawing Sheets

(56) References Cited

U.S. PATENT DOCUMENTS

| | | | |
|---|---|---|---|
| 2007/0123319 A1 | 5/2007 | Hwang | |
| 2007/0161414 A1 | 7/2007 | Wang et al. | |
| 2008/0204985 A1 | 8/2008 | Bae et al. | |
| 2008/0218484 A1 | 9/2008 | Nishiwaki | |
| 2009/0061961 A1* | 3/2009 | Ueta | H04M 1/0222 |
| | | | 455/575.3 |
| 2009/0111537 A1 | 4/2009 | Fujimoto et al. | |
| 2009/0235487 A1 | 9/2009 | Endo et al. | |
| 2010/0005627 A1 | 1/2010 | Endo et al. | |
| 2010/0212111 A1 | 8/2010 | Satou et al. | |
| 2010/0245369 A1 | 9/2010 | Yoshino | |
| 2011/0053664 A1 | 3/2011 | Shim et al. | |
| 2011/0063809 A1 | 3/2011 | Hoshino | |
| 2011/0080327 A1 | 4/2011 | Kobayashi et al. | |
| 2012/0129581 A1* | 5/2012 | Choi | H04M 1/0218 |
| | | | 455/575.3 |

FOREIGN PATENT DOCUMENTS

| | | | |
|---|---|---|---|
| CN | 1976363 A | 6/2007 | |
| CN | 101036373 A | 9/2007 | |
| CN | 101076234 A | 11/2007 | |
| CN | 101122808 A | 2/2008 | |
| CN | 101262512 A | 9/2008 | |
| CN | 101392790 A | 3/2009 | |
| CN | 101539165 A | 9/2009 | |
| CN | 101600003 A | 12/2009 | |
| CN | 101631151 A | 1/2010 | |
| CN | 101889148 A | 11/2010 | |
| CN | 201781704 U | 3/2011 | |
| CN | 102022420 A | 4/2011 | |
| CN | 102057534 A | 5/2011 | |
| CN | 102469183 A | 5/2012 | |
| CN | 108769317 A | 11/2018 | |
| CN | 108833627 A | 11/2018 | |
| EP | 1610530 A1 | 12/2005 | |
| JP | 2009071647 A | 4/2009 | |
| JP | 2009124449 A | 6/2009 | |
| JP | 2009272991 A | 11/2009 | |
| JP | 201081119 A | 4/2010 | |
| KR | 100842529 B1 | 7/2008 | |

OTHER PUBLICATIONS

First Office Action regarding Chinese Patent Application No. 201811448862.5, dated Nov. 19, 2019. Translation provided by Bohui Intellectual Property.

Second Office Action regarding Chinese Patent Application No. 201811448862.5, dated Jun. 11, 2020. Translation provided by Bohui Intellectual Property.

Third Office Action regarding Chinese Patent Application No. 201811448862.5, dated Nov. 2, 2020. Translation provided by Bohui Intellectual Property.

Notification to Grant Patent Right for Invention regarding Chinese Patent Application No. 201811448862.5, dated Mar. 2, 2021. Translation provided by Bohui Intellectual Property.

Supplemental European Search Report regarding Patent Application No. 19889614.4-1216/3890282; PCT/CN2019/115602, dated Dec. 10, 2021.

* cited by examiner

FOLDING MOBILE TERMINAL

CROSS-REFERENCE OF RELATED APPLICATIONS

This application is a Bypass Continuation Application of PCT/CN2019/115602 filed on Nov. 5, 2019, which claims priority to Chinese Patent Application No. 201811448862.5 filed on Nov. 28, 2018, which are incorporated herein by reference in their entirety.

TECHNICAL FIELD

The present disclosure relates to a folding mobile terminal.

BACKGROUND

As a user requirement improves, a mobile terminal in a related technology develops towards an increasingly large screen-to-body ratio. A relatively large screen-to-body ratio can not only improve appearance performance of the mobile terminal, but also improve display performance of the mobile terminal, and therefore is increasingly favored by users.

It is known that portability is important performance of the mobile terminal, and it is convenient for the user to use the mobile terminal. Therefore, in a design process, the overall size of the mobile terminal cannot be increased without limitations. When the overall size of the mobile terminal is determined, how to increase the screen-to-body ratio is an important direction for research and development of current manufacturers. In this case, a folding mobile terminal emerges as required.

In an expanded state, the folding mobile terminal can form a screen with a large area, to meet users' requirements for a large screen. In a folded state, the folding mobile terminal can reduce the entire size, so that the mobile terminal is folded into a smaller size, and it is convenient for the user to carry the mobile phone.

SUMMARY

Some embodiments of the present disclosure disclose a folding mobile terminal. The folding mobile terminal includes a first housing, a first screen, a second housing, a second screen, and a connecting clamp, where the first screen is disposed on the first housing, the second screen is disposed on the second housing, the first housing is connected to the second housing through the connecting clamp, one end of the connecting clamp is rotatably connected to the first housing and rotates around a first axis, the second housing is rotatably connected to the other end of the connecting clamp and rotates around a second axis, and the first axis and the second axis intersect or are non-coplanar.

BRIEF DESCRIPTION OF DRAWINGS

The accompanying drawings illustrated herein are provided to further understand the present disclosure and form a part of the present disclosure. The exemplary embodiments of the present disclosure and the descriptions thereof are used to explain the present disclosure and do not constitute an improper limitation on the present disclosure. In the accompanying drawings.

DESCRIPTION OF REFERENCE NUMERALS

100—First housing; 110—Plate-shaped portion; 120—Cylindrical portion;
200—First screen; 210—Prompt message display area;
300—Second housing;
400—Second screen;
500—Connecting clamp; 510—First connecting rod; 511—Connecting hole; 520—First connecting shaft; 530—Second connecting rod; 531—Second connecting shaft;
600—Camera;
A—First axis; B—Second axis; C—Third axis.

DESCRIPTION OF EMBODIMENTS

To make the objectives, technical solutions, and advantages of the present disclosure clearer, the following clearly describes the technical solutions in the present disclosure with reference to specific embodiments of the present disclosure and the corresponding accompanying drawings. Apparently, the described embodiments are some rather than all of the embodiments of the present disclosure. All other embodiments obtained by a person of ordinary skill in the art based on the embodiments of the present disclosure shall fall within the protection scope of the present disclosure.

In folding mobile terminal, two parts that can be folded relative to each other are connected via rotation, and in a process of expanding or folding, the two parts that can be folded relative to each other can be folded in only one direction, which results in less folding flexibility of the folding mobile terminal.

The following describes, in detail with reference to the accompanying drawings, the technical solutions disclosed by various embodiments of the present disclosure.

Referring to FIG. 1 to FIG. 9, an embodiment of the present disclosure discloses a folding mobile terminal, and the disclosed folding mobile terminal includes a first housing 100, a first screen 200, a second housing 300, a second screen 400, and a connecting clamp 500.

The first screen 200 is disposed on the first housing 100, the second screen 400 is disposed on the second housing 300, and the first housing 100 is connected to the second housing 300 through the connecting clamp 500, so that a whole formed by the first screen 200 and the first housing 100 is connected to a whole formed by the second screen 400 and the second housing 300.

In this embodiment, the folding mobile terminal has a folded state and an expanded state. When the folding mobile terminal is in the folded state, the first housing 100 and the second housing 300 are superposed together, and the first screen 200 and the second screen 400 may be superposed between the first housing 100 and the second housing 300. When the folding mobile terminal is in the expanded state, the first housing 100 and the second housing 300 are inverted relative to each other, so that expansion between the first screen 200 and the second screen 400 can be implemented.

One end of the connecting clamp 500 is rotatably connected to the first housing 100, and the connecting clamp 500 can rotate around a first axis A. The second housing 300 is rotatably connected to the other end of the connecting clamp 500, and the second housing 300 can rotate around a second axis B. In this embodiment, the first axis A and the second axis B intersect or are non-coplanar, in other words, the first axis A and the second axis B may be intersecting lines on a same plane. Certainly, the first axis A and the second axis B may be alternatively lines on different planes. For example, the first axis A and the second axis B may be perpendicular to each other.

Figure 8:
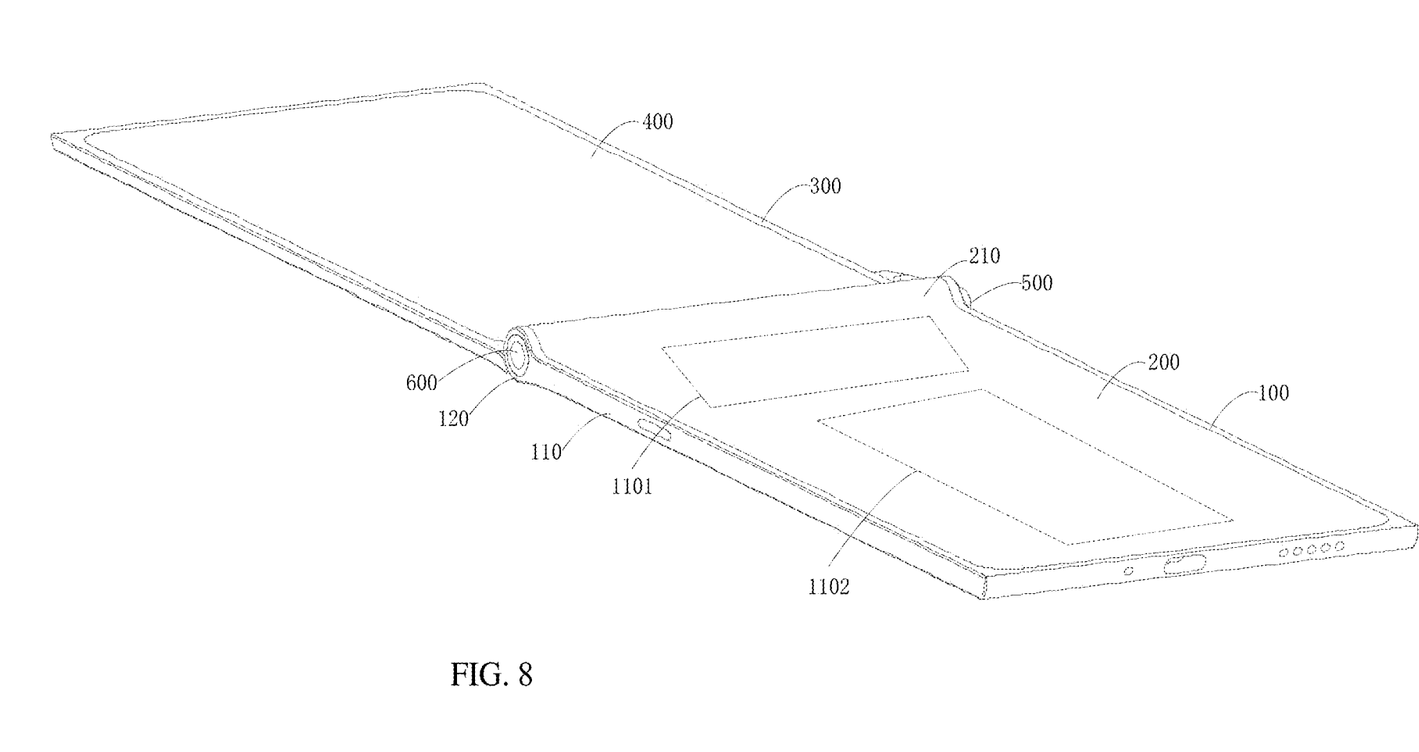
FIG. 8 is a schematic diagram of a folding mobile terminal in an expanded state disclosed in an embodiment of the present disclosure.
Figure 9:
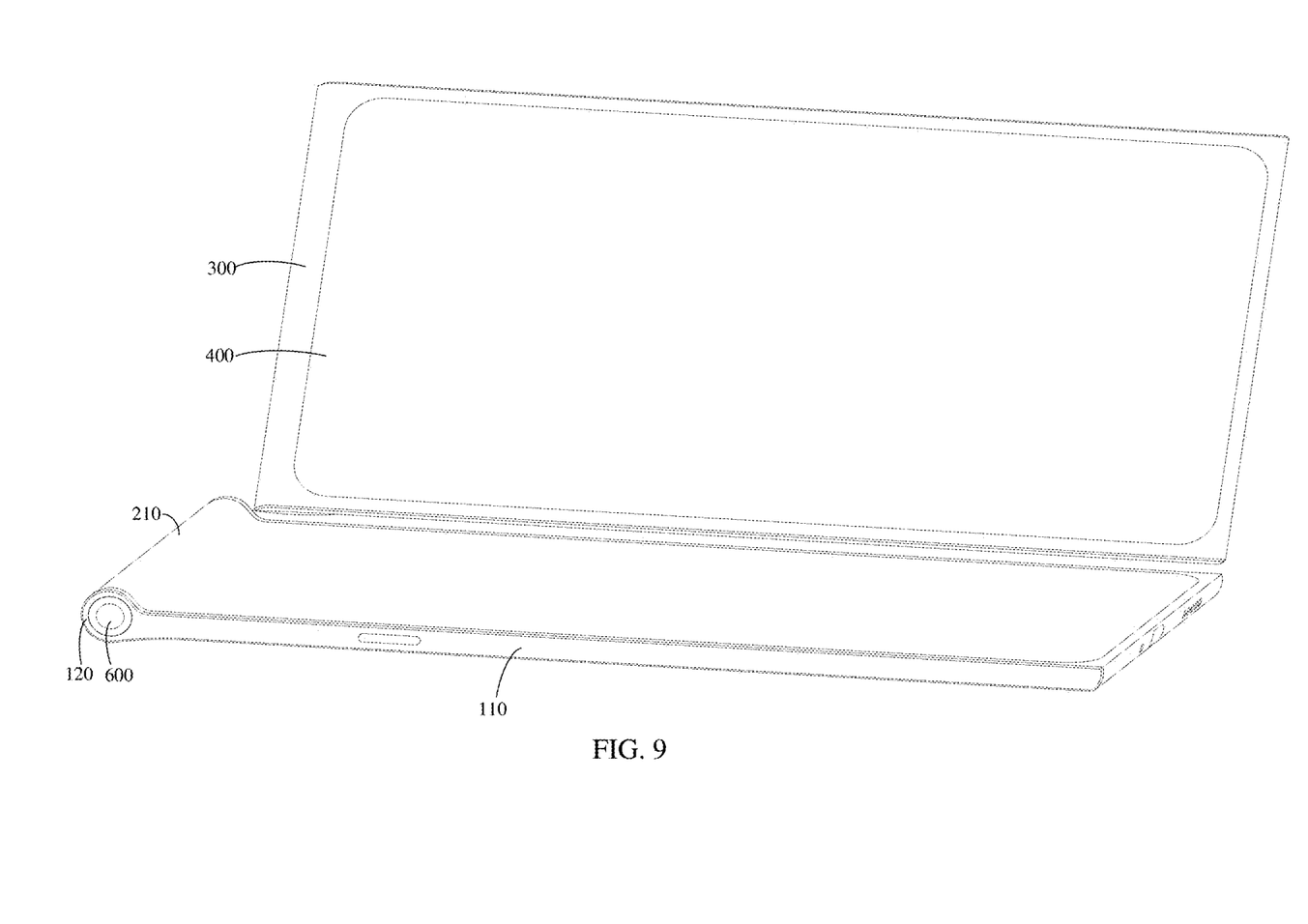
FIG. 9 is a schematic diagram of a folding mobile terminal in another expanded state disclosed in an embodiment of the present disclosure.

In an operating process, a user may flip the first housing 100 and the connecting clamp 500, so that the whole formed by the second housing 300 and the connecting clamp 500 rotates relative to the first housing 100 around the first axis A, so that the folding mobile terminal can be expanded to an expanded state (an expanded state shown in FIG. 8). Certainly, the second housing 300 may also be independently rotated, so that the second housing 300 rotates around the second axis B, and the folding mobile terminal is expanded to another expanded state (an expanded state shown in FIG. 9). Because the first axis A and the second axis B intersect, the second housing 300 can drive the second screen 400 to rotate in multiple rotation directions relative to the first housing 100 and the first screen 200, thereby more flexibly implementing expansion of the folding mobile terminal. It can be learned that the folding mobile terminal disclosed in this embodiment of the present disclosure is more flexible in an expanding process, and has various expansion manner.

Certainly, in an operating process, the user may control the second housing 300 to rotate around the first axis A and the second axis B, so that the folding mobile terminal can be in more expanded states.

The connecting clamp 500 is used to connect the first housing 100 and the second housing 300, and can implement more flexible folding between the first housing 100 and the second housing 300. There are multiple structures of the connecting clamp 500 that implement the foregoing functions. A specific structure of the connecting clamp 500 is not limited in this embodiment.

In an implementation, the connecting clamp 500 may include a first connecting rod 510, a first connecting shaft 520, and a second connecting rod 530. The first connecting rod 510 is rotatably connected to the first housing 100 through the first connecting shaft 520, and an axis of the first connecting shaft 520 is the first axis A. The second connecting rod 530 is rotatably connected to the other end of the first connecting rod 510, and an axis of the first connecting rod 510 is the second axis B, so that the second connecting rod 530 can rotate around the second axis B. The second connecting rod 530 is connected to the second housing 300, so that the second connecting rod 530 and the second housing 300 can rotate around the second axis B together. Because the first connecting rod 510 is rotatably connected to the first housing 100 through the first connecting shaft 520, the connecting clamp 500 can be rotated around the first axis A. Certainly, the whole formed by the second housing 300 and the connecting clamp 500 can also rotate around the first axis A, so that the folding mobile terminal can be expanded to the expanded state shown in FIG. 8.

The first connecting rod 510 is rotatably connected to the first housing 100 through the first connecting shaft 520. In some examples, the first connecting rod 510 is fixedly connected to the first connecting shaft 520, and the first connecting shaft 520 is rotatably connected to the first housing 100. In some other examples, the first connecting shaft 520 is fixedly connected to the first housing 100, and the first connecting rod 510 is rotatably connected to the first connecting shaft 520. Certainly, the connecting clamp 500 may further implement a rotation connection to the first housing 100 in another rotation cooperation manner. This is not limited to the foregoing two manners.

Figure 6:
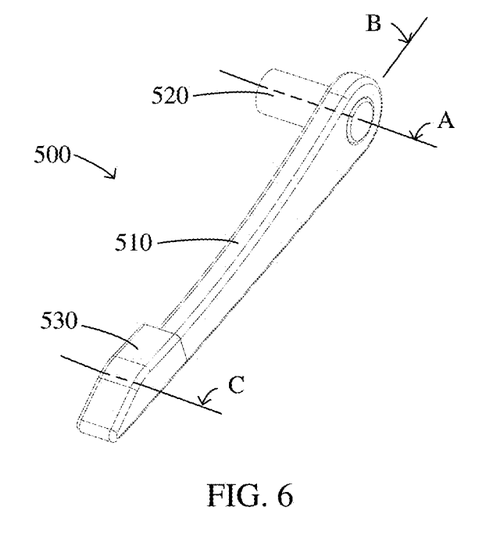
FIG. 6 is a schematic structural diagram of a rotational clamp disclosed in an embodiment of the present disclosure.
Figure 7:
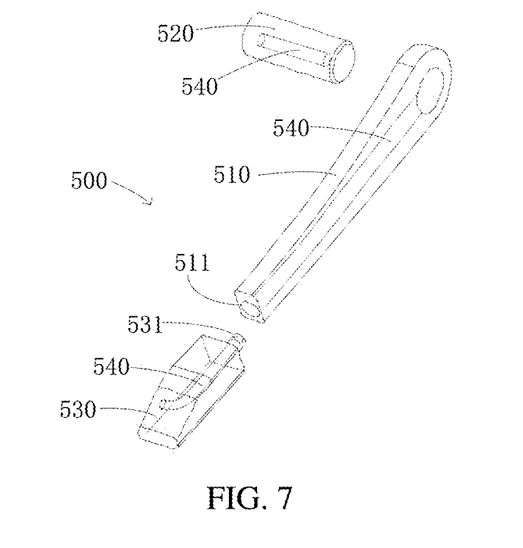
FIG. 7 is a schematic exploded diagram of a rotational clamp disclosed in an embodiment of the present disclosure.

Generally, the axis of the first connecting shaft 520 is a rotation axis of the connecting clamp 500, that is, the first axis A. For example, the first axis A may be perpendicular to the second axis B, and the axis of the second connecting rod 530 is generally an extension direction of the first connecting rod 510 or the second connecting rod 530, as shown in FIG. 6 and FIG. 7.

There are multiple manners of implementing rotation between the second connecting rod 530 and the first connecting rod 510. For example, a connecting hole 511 may be disposed on one of opposite end faces of the second connecting rod 530 and the first connecting rod 510, and a second connecting shaft 531 is disposed on the other opposite end face of the second connecting rod 530 and the first connecting rod 510. The second connecting shaft 531 is matched with the connecting hole 511 in a rotation manner, and an axis of the second connecting shaft 531 is the second axis B. In a process of assembling this structure, the second connecting shaft 531 is engaged with the connecting hole 511 to form a rotation cooperation, so that a rotation connection between the second connecting rod 530 and the first connecting rod 510 can be implemented. The foregoing assembly manner is simple in structure and easy to assemble, and can further improve compactness of assembling the first connecting rod 510 and the second connecting rod 530.

In the folding mobile terminal disclosed in this embodiment of the present disclosure, the whole formed by the first housing 100 and the first screen 200 may be independent of the whole formed by the second housing 300 and the second screen 400. However, generally, the whole formed by the first housing 100 and the first screen 200 is electrically connected to the whole formed by the second housing 300 and the second screen 400. Based on this, in an optional solution, the first connecting shaft 520, the first connecting rod 510, and the second connecting rod 530 may have a wire-through hole 540 each. The wire-through hole 540 of the first connecting shaft 520, the wire-through hole 540 of the first connecting rod 510, and the wire-through hole 540 of the second connecting rod 530 are connected in sequence to form a wire channel. The wire channel connects an inner cavity of the first housing 100 and an inner cavity of the second housing 300, so that a corresponding cable can pass through.

Generally, the folding mobile terminal is configured with a mainboard and a battery. Based on this, in an optional solution, the folding mobile terminal includes a battery 1102 and a mainboard 1101, and the battery 1102 or the mainboard 1101 is disposed in the inner cavity of the first housing 100. The battery 1102 or the mainboard 1101 may be electrically connected to the second screen 400 through the cable that passes through the wire channel, to supply power to the second screen 400 or send a signal to the second screen 400. Certainly, a battery may be disposed in each of the first housing 100 and the second housing 300, or a mainboard may be disposed in each of the first housing 100 and the second housing 300.

To further improve folding flexibility, in an optional solution, one end of the second connecting rod 530 may be rotatably connected to the first connecting rod 510, the second housing 300 is rotatably connected to the other end of the second connecting rod 530, and the second housing 300 can rotate around a third axis C, so that the second screen 400 can finally be rotated more flexibly. The third axis C and the second axis B intersect or are non-coplanar, in other words, the third axis C and the second axis B may be intersecting lines on a same plane. Certainly, the third axis C and the second axis B may be alternatively lines on different planes. In this case, the whole formed by the second housing 300 and the second screen 400 has more rotation dimensions. For example, the third axis C and the second axis B may be perpendicular to each other.

Figure 1:
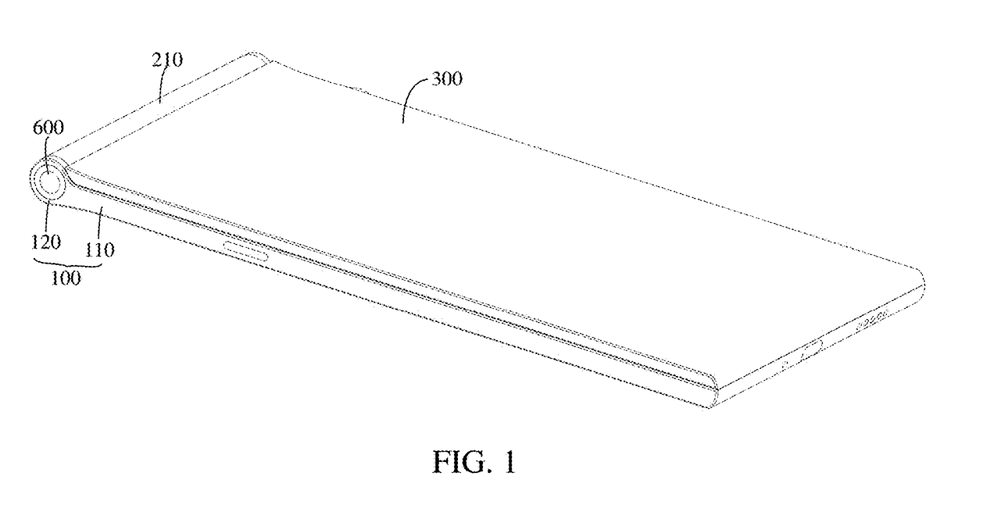
FIG. 1 to FIG. 5 are separately schematic diagrams of different perspectives of a folding mobile terminal disclosed in an embodiment of the present disclosure.
Figure 2:
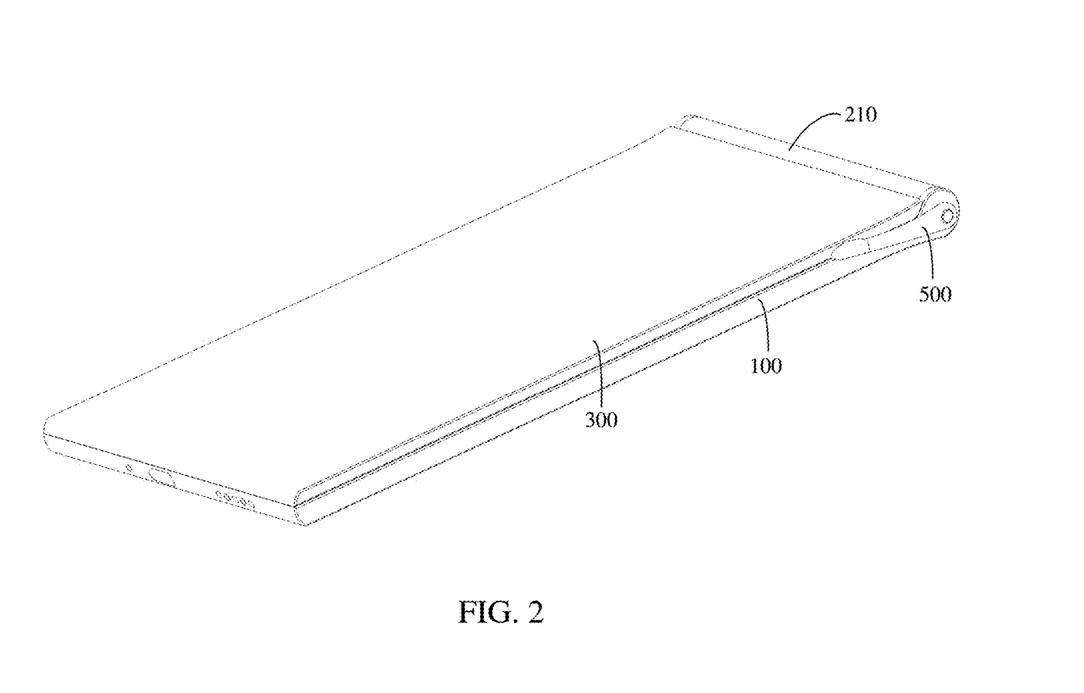
Figure 3:
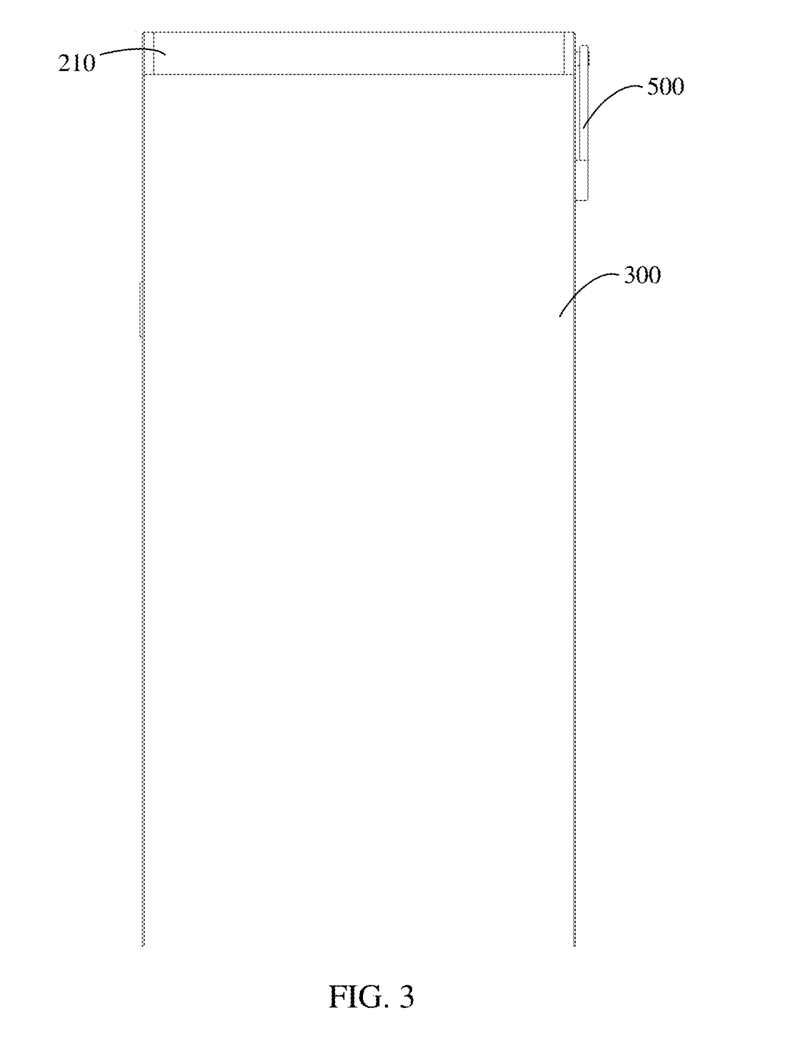
Figure 4:
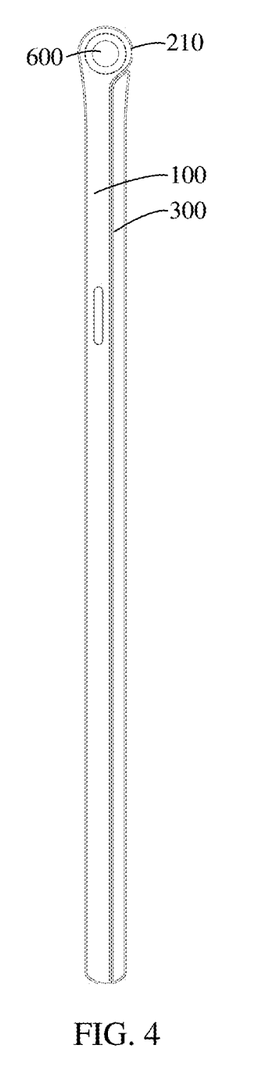
Figure 5:
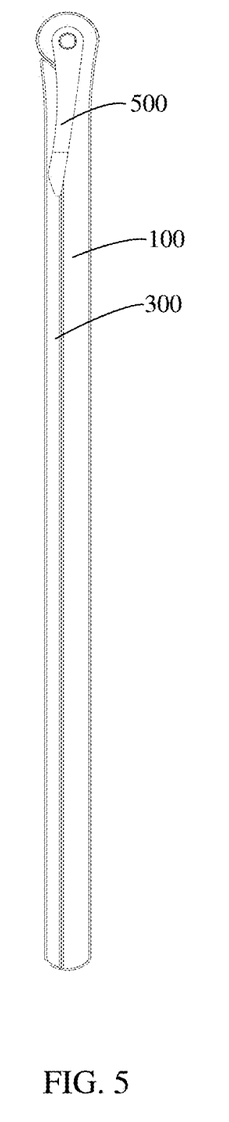

To implement better folding between the first housing 100 and the second housing 300, and to avoid impact exerted by the connecting clamp 500 on a structure of the first housing 100 and the second housing 300, in an optional solution, one end of the connecting clamp 500 is connected to a first side face of the first housing 100, the other end of the connecting clamp 500 is connected to a second side face of the second housing 300, and the first side face and the second side face are located on the same side of the folding mobile terminal. In this case, after the first housing 100 and the second housing 300 are folded, the connecting clamp 500 is located on a same side of the first housing 100 and the second housing 300, as shown in FIG. 2.

In this embodiment, the first housing 100 and the second housing 300 are peripheral basic components of the folding mobile terminal, and provide an installation basis for other components of the folding mobile terminal (for example, the first screen 200 and the second screen 400).

There may be multiple structures of the first housing 100 and the second housing 300. For example, the second housing 300 may be a hollow plate-shaped structure. Referring to FIG. 1 again, for example, the first housing 100 may include a plate-shaped portion 110 and a cylindrical portion 120. The cylindrical portion 120 is generally fixed to one end of the plate-shaped portion 110. For example, the cylindrical portion 120 and the first housing 100 may be in an integrated structure. The plate-shaped portion 110 is generally a hollow plate-shaped structure, and other components (such as the battery and the mainboard) of the folding mobile terminal may be disposed inside the plate-shaped portion 110.

When the folding mobile terminal is a folded state, the cylindrical portion 120 may extends beyond end faces of the two opposite ends of the second housing 300, the first screen 200 may be a flexible screen, and some areas of the first screen 200 are attached to a surface of the cylindrical portion 120. In this case, when the folding mobile terminal is in a folded state, some areas of the first screen 200 may be exposed, so that a display function can be played.

Generally, when the folding mobile terminal is in a folded state, the folding mobile terminal is in a standby state. However, in this case, the folding mobile terminal still needs to feed back some information for the user to use, refer to, or view. In an optional solution, an area attached to the cylindrical portion 120 on the first screen 200 is a prompt message display area 210. The prompt message display area 210 can display some prompt messages. For example, the prompt message display area 210 is configured to display at least one of a notification message or time information. The notification message may be a message such as a communication software message, stock push information, a short message, a missed call, or news push information. A specific type of the notification message is not limited in this embodiment.

The prompt message display area 210 can display the time information. In this case, the user does not need to open the folding mobile terminal chassis to view time. It can be seen that the prompt message display area 210 can facilitate use of the user. Certainly, some areas of the first screen 200 are attached to a surface of the cylindrical portion 120. The foregoing structure makes a structure of the folding mobile terminal relatively novel, and a homogeneity phenomenon of the mobile terminal can be better avoided.

In an optional solution, an end face of the second housing 300 on a side where the cylindrical portion 120 is located is a transitional curved surface. The transitional curved surface may be tangent to a cylindrical surface of the cylindrical portion 120, and can play a good junction function, thereby improving appearance performance of the folding mobile terminal.

As described above, the first housing 100 has an inner cavity, to provide mounting space for another component. In an optional solution, the cylindrical portion 120 may be a hollow structural part, a camera 600 may be disposed in the cylindrical portion 120, and a lens of the camera 600 may be disposed on an end face of the cylindrical portion 120. In this case, internal space of the cylindrical portion 120 can be fully utilized, so that the camera 600 can be disposed. In this setting manner, the user can shoot an image without a need to open the folding mobile terminal. Certainly, in a photographing process, with reference to a display function of the first screen 200 or the second screen 400, a better photographing effect is more easily achieved.

The folding mobile terminal disclosed in the embodiments of the present disclosure may be a mobile phone, a tablet computer, an e-book reader, a game console, or the like. A specific type of the mobile terminal is not limited in the embodiments of the present disclosure.

The foregoing embodiments of the present disclosure focus on describing differences between the embodiments, and different optimization features of the embodiments may be combined to form better embodiments provided that they are not contradictory. Considering brevity, details are not described herein again.

The foregoing descriptions are merely embodiments of this disclosure, but are not intended to limit this disclosure. For a person skilled in the art, the present disclosure may have various changes and variations. Any modification, equivalent replacement, or improvement made without departing from the spirit and principle of this disclosure shall fall within the scope of claims of this disclosure.

What is claimed is:

1. A folding mobile terminal, comprising a first housing, a first screen, a second housing, a second screen, and a connecting clamp, wherein the first screen is disposed on the first housing, the second screen is disposed on the second housing, the first housing is connected to the second housing through the connecting clamp, one end of the connecting clamp is rotatably connected to the first housing and rotates around a first axis, the second housing is rotatably connected to another end of the connecting clamp and rotates around a second axis, and the first axis and the second axis intersect or are non-coplanar; and wherein the connecting clamp comprises a first connecting rod, a first connecting shaft, and a second connecting rod, the first connecting rod is rotatably connected to the first housing through the first connecting shaft, an axis of the first connecting shaft is the first axis, the second connecting rod is rotatably connected to another end of the first connecting rod, an axis of the first connecting rod is the second axis, and the second connecting rod is connected to the second housing.

2. The folding mobile terminal according to claim 1, wherein the first axis is perpendicular to the second axis.

3. The folding mobile terminal according to claim 1, wherein the first connecting shaft, the first connecting rod, and the second connecting rod each have a wire-through hole, the wire-through hole of the first connecting shaft, the wire-through hole of the first connecting rod, and the wire-through hole of the second connecting rod are connected and form a wire channel, and the wire channel connects an inner cavity of the first housing and an inner cavity of the second housing.

4. The folding mobile terminal according to claim 3, wherein the folding mobile terminal further comprises a battery or a mainboard, the battery or the mainboard is disposed in the inner cavity of the first housing, and the battery or the mainboard is electrically connected to the second screen through a cable passing through the wire channel.

5. The folding mobile terminal according to claim 1, wherein one end of the second connecting rod is rotatably connected to the first connecting rod, the second housing is rotatably connected to another end of the second connecting rod and rotates around a third axis, and the third axis and the second axis intersect or are non-coplanar.

6. The folding mobile terminal according to claim 1, wherein a connecting hole is disposed on one of opposite end faces of the second connecting rod and the first connecting rod, a second connecting shaft is disposed on another opposite end face of the second connecting rod and the first connecting rod, the second connecting shaft is matched with the connecting hole in a rotation manner, and an axis of the second connecting shaft is the second axis.

7. The folding mobile terminal according to claim 1, wherein one end of the connecting clamp is connected to a first side face of the first housing, another end of the connecting clamp is connected to a second side face of the second housing, and the first side face and the second side face are located on a same side of the folding mobile terminal.

8. The folding mobile terminal according to claim 1, wherein the first housing comprises a plate-shaped portion and a cylindrical portion fastened to one end of the plate-shaped portion, and when the folding mobile terminal is in a folding state, the cylindrical portion extends beyond end faces of two opposite ends of the second housing, the first screen is a flexible screen, and a partial area of the first screen is attached to a surface of the cylindrical portion.

9. The folding mobile terminal according to claim 8, wherein the area attached to the cylindrical portion on the first screen is a prompt message display area.

10. The folding mobile terminal according to claim 8, wherein an end face of the second housing on a side where the cylindrical portion is located is a transitional curved surface.

11. The folding mobile terminal according to claim 8, wherein the cylindrical portion is a hollow mechanical part, a camera is disposed in the cylindrical portion, and a lens of the camera is disposed on an end face of the cylindrical portion.

12. The folding mobile terminal according to claim 1, wherein the folding mobile terminal is a mobile phone, a tablet computer, an e-book reader, or a game console.

\* \* \* \* \*